United States Patent
Ponnaluri et al.

(10) Patent No.: US 7,567,064 B2
(45) Date of Patent: Jul. 28, 2009

(54) SYSTEMS OF PARALLEL OPERATING POWER ELECTRONIC CONVERTERS

(75) Inventors: Srinivas Ponnaluri, Untersiggenthal (CH); Peter Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 12/062,151

(22) Filed: Apr. 3, 2008

(65) Prior Publication Data

US 2008/0211464 A1 Sep. 4, 2008

Related U.S. Application Data

(63) Continuation of application No. PCT/CH2006/000524, filed on Sep. 29, 2006.

(30) Foreign Application Priority Data

Oct. 3, 2005 (EP) .................................. 05405568

(51) Int. Cl.
*G05F 1/70* (2006.01)
(52) U.S. Cl. ..................................................... 323/207
(58) Field of Classification Search ................. 323/207; 363/71
See application file for complete search history.

(56) References Cited

U.S. PATENT DOCUMENTS 7,116,010 B2 * 10/2006 Lasseter et al. ............... 307/45
2004/0136214 A1 7/2004 Tan et al.

OTHER PUBLICATIONS

Form PCT/ISA/210 (International Search Report) dated Sep. 20, 2007.
Form PCT/ISA/237 (Written Opinion of the International Searching Authority) dated Sep. 20, 2007.
European Search Report dated Jun. 23, 2006.
Mukul C. Chandorkar et al., "Control of Parallel Connected Inverters in Standalone AC Supply Systems", IEEE Transactions on Industry Applications, Jan./Feb. 1993, vol. 29, No. 1, pp. 136-143, XP-000358874 (cited in International Search Report, Written Opinion, European Seach Report and on p. 3 of the specification).
Shinzo Tamai et al., "Parallel Operation of Digital Controlled UPS System", Proceedings of the International Conference on Industrial Electronics, Control and Instrumentation (IECON), Oct. 28-Nov. 1, 1991, vol. vol. 1 Conf. 17, pp. 326-331, XP-010041810 (cited in International Search Report and European Search Report).

(Continued)

*Primary Examiner*—Shawn Riley
(74) *Attorney, Agent, or Firm*—Buchanan Ingersoll & Rooney PC

(57) ABSTRACT

A converter unit is disclosed which produces an output voltage based on reference signals ($u^*_d$, $u^*_q$) that are generated from active and reactive components (P, Q) of the converter's output power. A first reference signal for a reactive component of the output voltage ($u^*_q$) is set to zero, thus regulating the reactive component of the output voltage to zero. Therefore, only the active component is contributing to the actual output voltage. The reference signal for the active component of the output voltage ($u^*_d$) is produced based on the active power component (P) with an active power vs. active voltage droop. To synchronize the frequencies of multiple converter units, a reactive power vs. frequency droop can be introduced for each converter unit, regulating the frequency based on changes in the reactive power component (Q) of each converter unit.

8 Claims, 4 Drawing Sheets

OTHER PUBLICATIONS

Takao Kawabata et al., "Parallel Operation of Voltage Source Inverters", IEEE Transactions on Industry Applications, vol. 24, No. 2, Mar./Apr. 1998, pp. 281-287 (cited on p. 3 of the specification).

C.S. Lee et al., "Parallel U.P.S. With a Instantaneous Current Sharing Control", IECON, IEEE, 1998, pp. 568-573, (cited on p. 3 of the specification).

Mukul C. Chandorkar, "Distributed Uninterruptible Power Supply Systems", University of Wisconsin-Madison, USA (Dissertation for the Degree of Doctor of Philosophy—Electrical Engineering, 1995, the whole book (cited on p. 3 of the specification).

Anil Tuladhar et al., "Control of Parallel Inverters in Distributed AC Power Systems With Consideration of Line Impedance Effect", IEEE Transactions on Industrial Applications, vol. 36, No. 1, Jan./Feb. 2000, pp. 131-138 (cited on p. 3 of the specification).

* cited by examiner

SYSTEMS OF PARALLEL OPERATING POWER ELECTRONIC CONVERTERS

RELATED APPLICATIONS

This application claims priority under 35 U.S.C. §119 to EP Application 05405568.6 filed in Europe on Oct. 3, 2005, and as a continuation application under 35 U.S.C. §120 to PCT/CH2006/000524 filed as an International Application on Sep. 29, 2006 designating the U.S., the entire contents of which are hereby incorporated by reference in their entireties.

TECHNICAL FIELD

The present disclosure relates to the field of power electronics, and more particularly to a system of parallel operating AC power electronic converters and a method to control such a system.

BACKGROUND INFORMATION

Parallel operation of power generator units is used to share loads of a utility grid or an island system amongst two or more units. An increased power rating can be met by paralleling two lower power units so that there is no need for one single high power unit. Parallel operation of several units allows routine maintenance of one unit without having to completely shut down the system, since other power generators can temporarily take over the load from the one unit being stopped for maintenance. As in any parallel operation, redundancy of power generation increases the availability of power in the utility grid.

While in grid mode, with the various power generator units connected to a utility grid with stable voltage and frequencies, the operation of several power generation units in parallel is less critical, but operation of parallel connected power generator units in islanding is still challenging. Since the power generation units can be located quite far apart with significant line impedance between them, parallel operation of several units should be achieved with no or minimum control communication.

In the past, various attempts to control parallel power generator units have been made.

One unit can be connected to batteries and can be defined as the master that controls the island bus voltage and frequency to a set value. All other units operate in grid mode. Any change in load is detected and taken by the master unit with the help of battery backup for load jump support. The master unit can dip the system frequency and the output voltage to communicate with other units about the active and reactive loads respectively. The control circuits of the other units can measure the frequency and the voltage values of the island network, and calculate the active and reactive power references respectively and generate the same. As the other units pick up the power, the master unit decreases its generation and maintains the system voltage and frequency. The process will go on until there is stability in the entire system. Even though the control with a battery backed master works well in most systems, the dynamic performance of this two stepped approach can be very slow.

In a variation, rather than being synchronized to the master unit, all of the parallel operated units, including the battery-backed master unit, are synchronized to the island network with a phase locked loop (PLL), a closed loop frequency control system, in which functioning can be based on the phase sensitive detection of a phase difference between the input and output signals. The PLL synchronization signal which can be distributed to all units can be taken from an external sine wave generator. To avoid wires, the sine wave can be communicated over a wireless connection.

In another variation, instead of using an external sine wave generator, a master unit sets the system frequency to a constant value. All other units in parallel can lock to that frequency with a PLL. The so-called droop method can be used to stabilize the system. Active power vs. frequency-droops and reactive power vs. voltage-droops are based on the fact that for inverters, the active power P is predominantly dependent on the phase angle φ between the output voltage of the inverter and the load voltage, while the reactive power Q mostly depends on the output-voltage amplitude E. With droop coefficients m and n the following equations or droops can be described:

$$\omega = \omega^* - m\,P \quad (\omega^* = \text{frequency at no load})$$

$$E = E^* - n\,Q \quad (E^* = \text{output voltage at no load})$$

One possible approach for parallel operation of voltage source converters in islanding without communication has been proposed by "*Parallel Operation of Voltage Source Inverters*", T. Kawabata et al., *IEEE Transactions on Industry Applications*, Vol 24, No. 2, March/April, 1988. Active power vs. frequency and reactive power vs. voltage droops are introduced to share the active and reactive power.

Parallel operation with current minor loops but with communication of total load current has been proposed by "*Parallel U.P.S. with an Instantaneous Current Sharing Control*", Jang-Sik Yoo, et al., *IECON, IEEE, pp.* 568~573, 1998. In this case the total load current is measured, is divided with number of units in operation and then fed-forward to each inner current controller.

Another method for controlling parallel operation of converters has been disclosed in "Control of Parallel Inverters in Distributed AC Power Systems with Consideration of Line Impedance Effect", Anil Tuladhar et al., IEEE Transactions on Industrial Applications, Vol 36, No. 1, January/February 2000, with communication through the power network by injecting special frequency signals for communication.

In "Distributed Uninterruptible Power Supply Systems" by Mukul C. Chandorkar of the University of Wisconsin-Madison, USA (Dissertation for the degree of Doctor of Philosophy—Electrical Engineering—1995), which is incorporated hereto by reference in its entirety, the operation and control of distributed networks and uninterruptible power supply (UPS) systems are described in detail. In Chapter 2.3.1, the parallel operation of voltage source inverters is described, making use of current minor loop on page 30. The system is shown in FIG. 2.16 on page 30. On page 31, second paragraph, the author notes that when applying a current control scheme, it is mandatory to have a communication link between invertors running in parallel. Otherwise the current controllers of different parallel units will interact to make the control scheme unstable.

In "Control of Parallel Connected Inverters in Standalone AC Supply Systems" by the same author (Mukul C. Chandorkar) in an IEEE Transaction on Industry Applications, vol. 29, no. 1, January 1993, a control scheme for controlling inverters in a standalone system is described in which the entire AC power is delivered through inverters without any synchronous alternators. In the control system described therein, measured currents are fed back and used for power calculation and control. Current however is again not controlled in the described system, hence there are no inner current loops.

SUMMARY

Exemplary embodiments disclosed herein are directed to an enhanced system for parallel operation of power electronic converter units with independent control of each converter unit.

A power conversion system comprising two or more AC output converter units of a variable AC output voltage is disclosed, each converter unit including means for controlling an output voltage of said converter unit, said means for controlling an output voltage having means to produce two perpendicularly-intersecting reactive and active voltage vectors ($u_q$, $u_d$) from the output voltage of said converter unit to produce a reactive power component (Q) and an active power component (P), respectively; and means for producing reference signals for controlling the output voltage of said converter in response to the reactive and active power components, wherein said means for producing reference signals for controlling the output voltage includes inner current control loops; an active power vs. active voltage droop u=u*−m P for generating an active voltage reference signal from the active power component, with u* being the active voltage with P=0 and m being a constant; and a reactive power vs. frequency droop f=f*−n Q to regulate a frequency of the output voltage from the reactive power component, with f* being the frequency with Q=0 and n being a constant.

A power conversion system comprising two or more AC output converter units of a variable AC output voltage is disclosed, each converter unit including means for controlling an output voltage of said converter unit, said means for controlling an output voltage having means to produce two perpendicularly-intersecting reactive and active voltage vectors ($u_q$, $u_d$) in response to the output voltage of said converter unit to produce a reactive power component (Q) and active power component (P), respectively; and means for producing reference signals for controlling the output voltage of said converter in response to the reactive and active power components, wherein a phase locked loop is used for generating a frequency and a phase for transforming measured voltages and currents into said reactive and active voltage vectors ($u_q$, $u_d$), and wherein said means for producing reference signals for controlling the output voltage includes inner current control loops; and an active power vs. frequency droop f=f*−n P for regulating the frequency of the output voltage, with f* being a frequency with P=0 and n being a constant.

A method for controlling two or more AC output converter units of a variable AC output voltage is disclosed, comprising: producing perpendicularly-intersecting reactive and active voltage vectors ($u_q$, $u_d$) to control the output voltage and to produce a reactive power component (Q) and active power component (P), respectively; producing reference signals to regulate reactive and active components of the output voltage; setting the reference signal of the reactive component of the output voltage to zero; regulating the reactive component of the output voltage to zero; setting the active voltage reference according to an active power vs. active voltage droop u=u*−m P, with u* being the active voltage with P=0 and m being a constant, to regulate the active voltage component of the output voltage based on the active power component; and setting the frequency of the output voltage according to a reactive power vs. frequency droop f=f*−n Q, with f* being the frequency with Q=0 and n being a constant, to regulate the frequency based on the reactive power component.

A method for controlling two or more AC output converter units of a variable AC output voltage is disclosed, comprising: producing perpendicularly-intersecting reactive and active voltage vectors ($u_q$, $u_d$) to control the output voltage and to produce a reactive power component (Q) and active power component (P), respectively, with a phase locked loop generating a frequency and a phase for transforming measured voltages and currents into said reactive and active voltage vectors; producing reference signals to regulate reactive and active components of the output voltage; setting the reference signal of the reactive component of the output voltage to zero; regulating the reactive component of the output voltage to zero; and setting the frequency of the output voltage according to an active power vs. frequency droop f=f*−n P, with f* being the frequency with P=0 and n being a constant, to regulate a frequency of the output voltage based on the active power component.

An AC output converter unit is disclosed, comprising means for controlling an output voltage of said converter unit, said means for controlling an output voltage having means to produce two perpendicularly-intersecting reactive and active voltage vectors ($u_q$, $u_d$) from the output voltage of said converter unit to produce a reactive power component (Q) and an active power component (P), respectively; and means for producing reference signals for controlling the output voltage of said converter in response to the reactive and active power components, wherein said means for producing reference signals for controlling the output voltage includes an inner current control loop and implements a droop method regulate a frequency of the output voltage.

BRIEF DESCRIPTION OF THE DRAWINGS

The disclosed method and device will be explained in more details on the bases of the drawings. The drawings show in FIG. 1 an exemplary control structure of a converter unit in island mode.

DETAILED DESCRIPTION

In a first exemplary embodiment, with two or more AC converter units operating in parallel, the control means of each converter unit produces an AC output voltage based on reference signals that are generated from the active and reactive components of each converter's output power. A first reference signal for a reactive component of the output voltage is set to zero, thus regulating the reactive component of the output voltage to zero. Therefore, only the active component is contributing to the actual output voltage. The reference signal for the active component of the output voltage is produced based on the active power component with an active power vs. active voltage droop. To synchronize the frequencies of all converter units, a reactive power vs. frequency droop is introduced for each converter unit, regulating the frequency based on changes in the reactive power component of each converter unit.

Since the control means of each converter unit produces its reference signals based on the converter unit's own reactive and active power output, no communication is necessary between the various converter units operating in parallel. Converter units can therefore be placed anywhere without communication.

In a second exemplary embodiment with several converter units operating in parallel, the frequency reference for the output voltage switching signals is generated by an active power vs. frequency droop.

Figure 1:
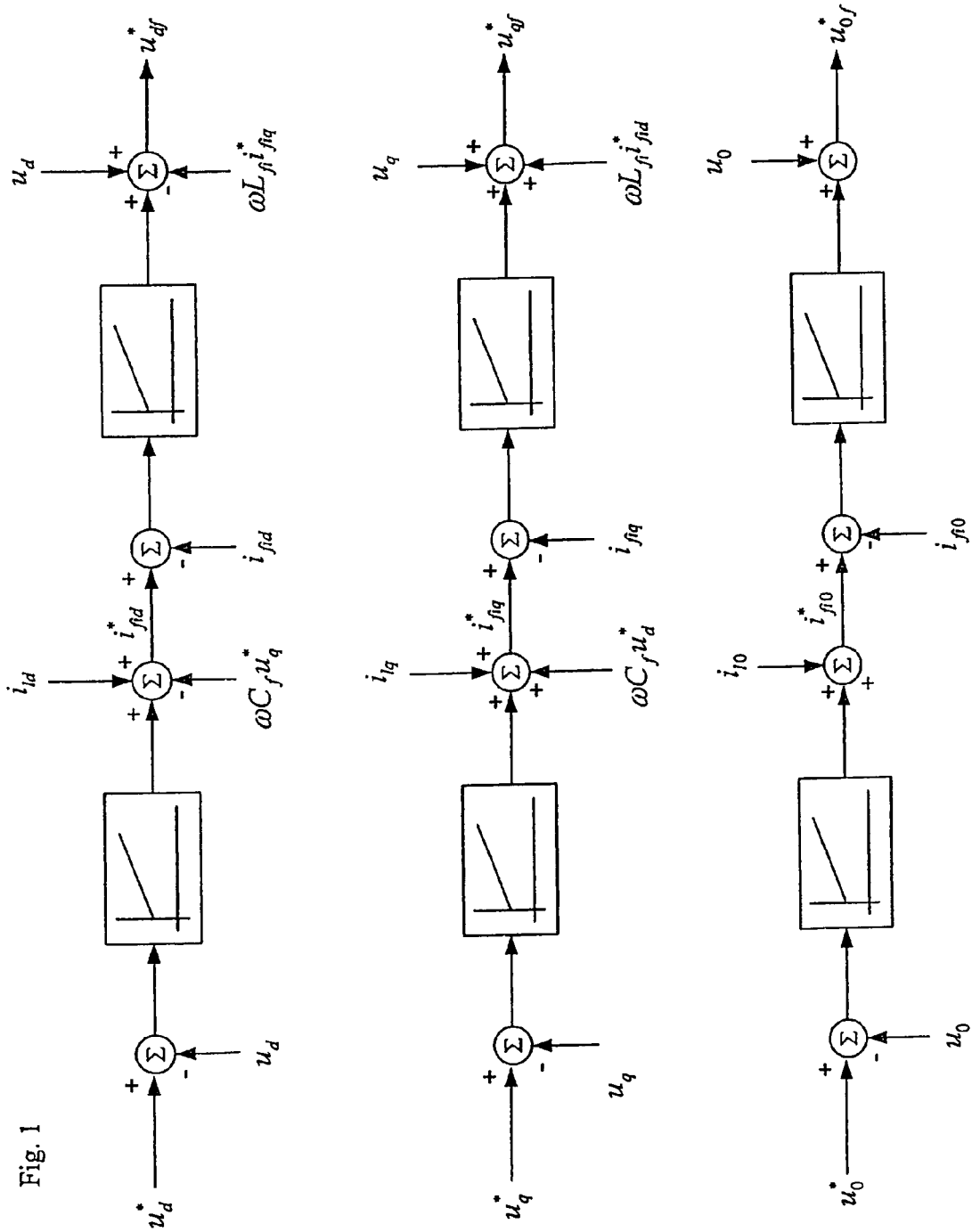

A control structure for an exemplary converter unit in islanding is shown in FIG. 1. The converter control is implemented in a dq0 reference frame. The active d-axis reference voltage corresponds to the actual output voltage of the converter unit, while the reactive q-axis references and the zero-axis references are set to zero. The outputs of the three voltage controllers are added to the corresponding components of the load currents and to the respective capacitor currents necessary to maintain the set reference voltages. This results in the total current reference for inductor $L_{fi}$. The error in the inductor currents is fed to the PI controllers and the output of the current controllers is finally added to the respective output voltage feed forward.

The voltage feed forward includes a complete LCL filter model to obtain the given reference.

The frequency reference can be fixed in islanding. Because of the load current feed forward, the converter can immediately supply any change in the load current. This can reduce the output voltage change to a minimum during transients. Alternatively the actual feedback currents can be used for voltage decoupling terms. The voltage controllers can then adjust their output to correct the remaining load voltage.

In addition, negative and zero sequence unbalance voltage controllers can be implemented for islanding units. These controllers can be used whenever large line-to-line and line-to-neutral loads are connected on an island network. If these loads are close to the rated load, then the voltage unbalance controllers will keep the voltages within acceptable limits.

As in distributed power generating, the output voltage of a converter can be controlled in closed loop with d and q axis decoupled to obtain faster response. The droop principles of normal power system generators (active power vs. frequency and reactive power vs. voltage droops) are not used to stabilize the system.

In a system with several converter units operating in parallel, the converter units can be connected on the same system bus. If the outputs of the units are directly connected, all the converter units try to control the same voltage. If the outputs of some of the converter units are separated from the others by a larger system impedance, the separated converter units try to control their respective outputs.

The outputs of the d-axis controllers of each converter unit represent the d-axis currents, which correspond to the active portions of the load. The outputs of the q-axis voltage controllers represent the q-axis current and correspond to the reactive portion of the load. In an exemplary control, q axis voltage in each converter is controlled to zero. This means each DG sees the island grid voltage only as a d axis voltage in steady state.

Figure 2:
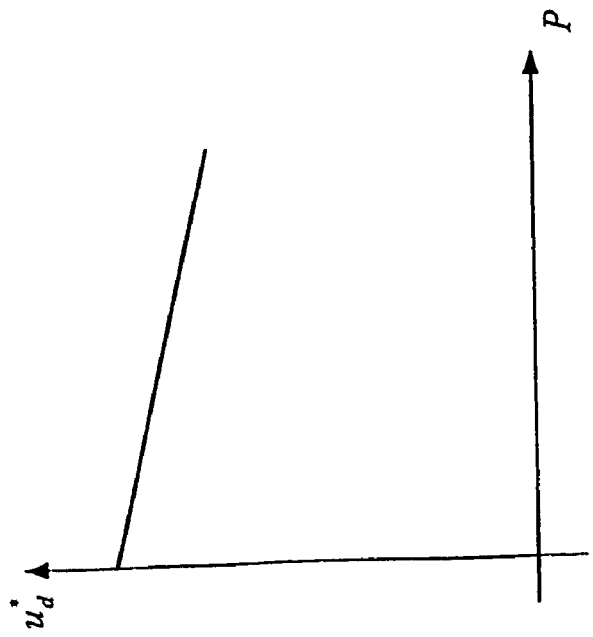
FIG. 2 an exemplary active power (P) vs. active voltage ($u_d$) reference droop characteristic.

As the reactive q-axis voltages are controlled to zero in each converter unit, the active d-axis voltages are in-phase while operating in steady state. If a circulating power builds up amongst the parallel operated converter units and leads to an increase in the active power of one or two converter units, then the active voltage reference of these converter units can be reduced. Since in each converter unit, the d-axis voltage controller output represents the active current, decreasing active voltages lead to reduced active current references. This process is kept up until the active power is again shared amongst all converters in accordance with the power ratings of the paralleled converters. In each of the converters operated in parallel, an active power (P) vs. active voltage ($u_d$) reference droop characteristic as shown in FIG. 2 is introduced to share the active power equally amongst all the converter units. If the active power of one of the converter units increases, the active voltage of this converter is reduced according to the droop characteristic.

Figure 3:
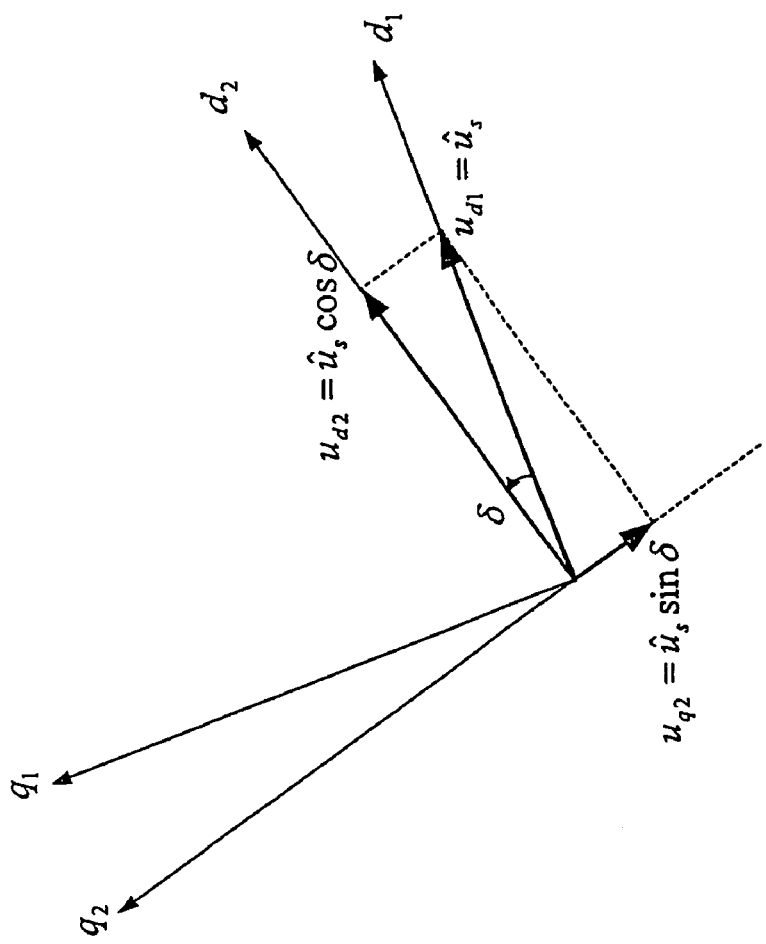
FIG. 3 an exemplary reference frame disorientation of two converters operated in parallel.

The same system voltage when measured by two difference units can be seen differently if the orientations of two systems are slightly different. This reflects as an error in the reactive q-axis voltage shown in FIG. 3. In this drawing, converter unit 1 is perfectly oriented to its reference frame. The q-axis voltage $u_{q1}$ is zero and according to the transformation definition, the d-axis voltage $u_{d1}$ is equal to the peak value of the output voltage $u_s$.

The frame of converter unit 2 is slightly leading the frame of converter unit 1 by an angle δ. As the terminal voltage is common it sees a positive d axis voltage $u_{d2}$ and a negative q axis voltage $u_{q2}$. The q axis controller of converter unit 2 will try to correct this by increasing the reactive current reference, which results in a circulation of reactive power. As a consequence, the frequency of each of the parallel converter systems is changed as a function of reactive power so that the circulating reactive power is dampened. To automatically stabilize parallel converter systems, a reactive power (Q) vs. frequency (ω) droop is implemented for an islanding operation. The output of the droop characteristic is used as the reference frequency. This frequency is integrated and the integrator output, which is the phase (angle), is used for the transformation.

The system frequency will be brought to a stable state at a value depending on the total system reactive power.

Figure 4:
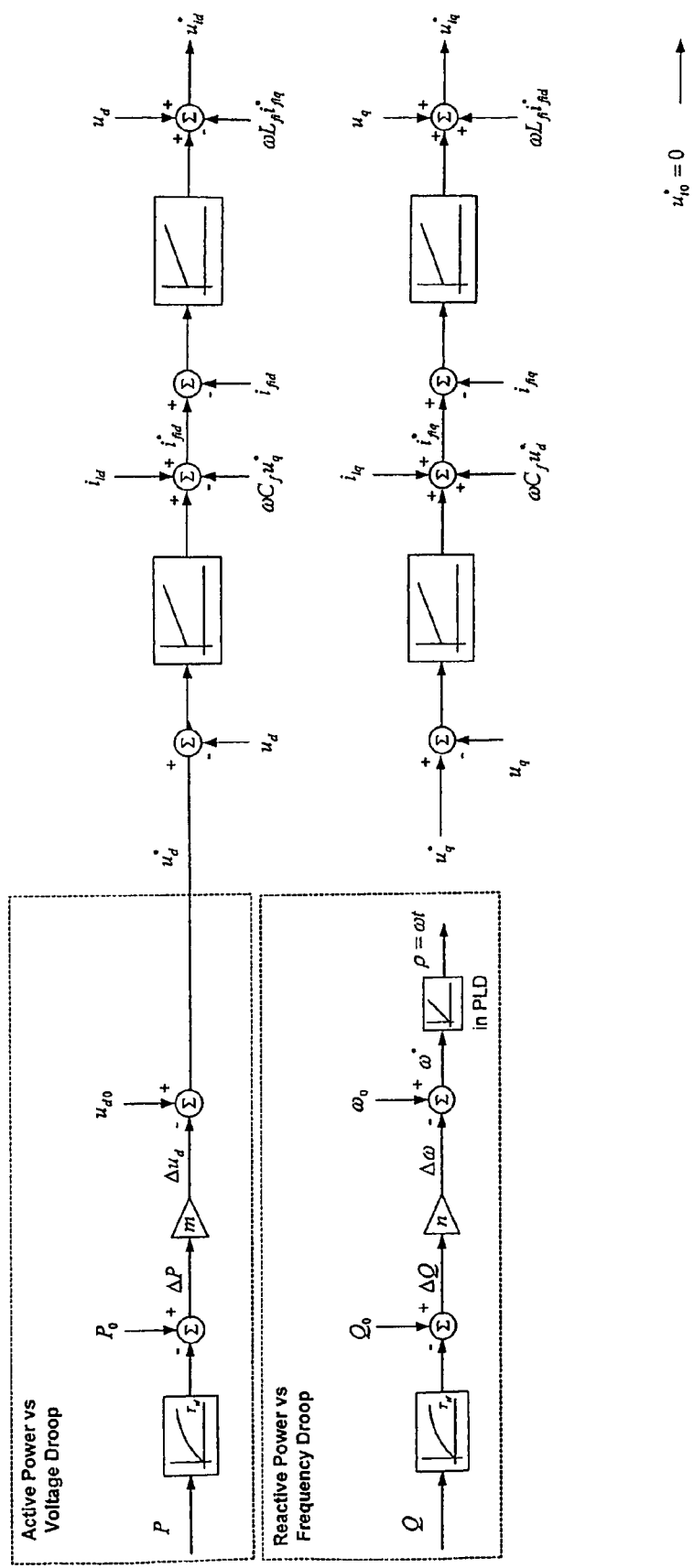
FIG. 4 a first exemplary embodiment of the disclosed control for converter units in island mode.

With an exemplary control system for parallel operated converter units as shown in FIG. 4, both active and reactive power sharing is stable even when the paralleled converter units are remote and far apart. Communication between the various converter units is not necessary due, at least in part, to the two disclosed reference droop characteristics which allow a dynamic autonomous stabilization of each converter unit.

The maximum output current of a voltage controller is the reference current which is set to the rated value of the converter. Whenever the voltage controller hits its power limit, the voltage controller will turn into a current source, controlling the current equal to the reference current. This can happen, for example, in case of overloading the converter.

The disclosed reference droops can be used to operate a single converter unit as well. Upper level droops set the voltage vector magnitude and the frequency for the system. Frequency is directly written to a programmable logic device (PLD) as a reference and the frequency integrator is implemented in the PLD.

Figure 5:
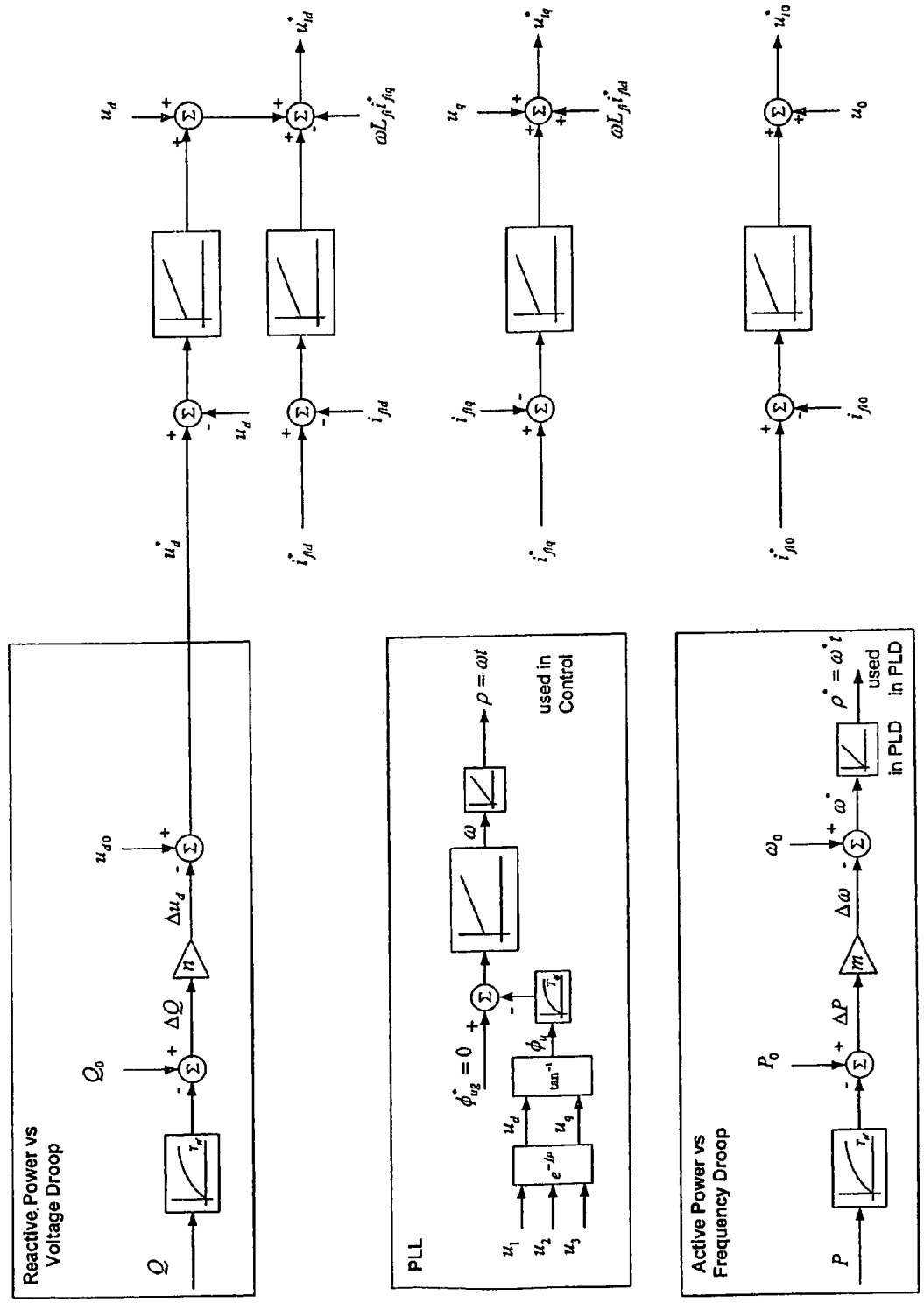
FIG. 5 a second exemplary embodiment of the disclosed control for converter units in island mode.

In a second exemplary embodiment of the control system for parallel operated converter units as shown in FIG. 5, the frequency reference generated by an active power vs. frequency droop is directly used as reference for the switching signals to generate the AC voltage and therefore written directly on the PLD generating such signals. The integrator output of the reference frequency is used by the output voltage control in the PLD and not by the control for the transformation of the measured voltages and currents.

The phase locked loop (PLL) used to keep the frequency of the output voltage stable is often enabled only during grid mode. In this second embodiment, the PLL is activated, but the q-axis voltage controller is disabled. Regulating q-axis voltage to zero can prevent a conflict between the PLL and the q-axis voltage controller to make the d-axis oriented to the output voltage. The phase (angle) produced by the PLL (ρ=ωt) is used for the transformation of the measured voltages and currents into perpendicularly-intersecting reactive and active voltage, current and power vectors.

The PLL will lock to the frequency of the overall system in the case of multiple units and to the frequency reference generated within the control from the active power vs. frequency droop in case of single unit. Thus the control is not altered in case of single and multiple units.

In an exemplary embodiment, the current controllers can be disabled and only enabled once the system becomes overloaded. This can keep the unit running at and below a current limit for an indefinite period of time. The current limits can be set corresponding to the rated values. An over-riding system controller can bring this unit out of the current limit mode when the overall system loading is reduced. In such a case the current controllers can be disabled and the control system as described earlier is activated. If the overriding controller does not reset this situation, then this inverter will run at rated current and can share a different part of the load compared to other inverters in the circuit. An auto-reset can be implemented in the unit control which disables the current controllers and enables the normal control after a pre-determined time. This can avoid a communication with an overriding controller.

When the unit is operating in a current limit and the total system load is lower than the load supplied by this inverter, the modulation index and consequently the output voltage can rise. This information can be used to disable the current controllers and re-activate the voltage controllers.

Both q and 0 axis voltage references can be set to zero during the normal operation.

The quantity related to the frequency can be shared more accurately in both the proposed exemplary methods, as the system frequency can be exactly the same everywhere. In the first system it is the reactive power, and in the second system it is the active power. With respect to this point the later proposed system can have an advantage over the former.

The zero axis loop is not changed and the d axis voltage controller output is added directly to the d axis voltage reference to obtain a stiff control on the voltage in the direction of only the d axis.

A droop can also be realized using the actual values of active and reactive power or the reference values if generated by the control scheme, such as in the first embodiment.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. Power conversion system comprising: two or more AC output converter units of a variable AC output voltage, each converter unit including:
    means for controlling an output voltage converter unit, said means for controlling an output voltage having means to produce two perpendicularly-intersecting reactive and active voltage vectors ($u_q$, $u_d$) from the output voltage of said converter unit to produce a reactive power component (Q) and an active power component (P), respectively; and
    means for producing reference signals for controlling the output voltage of said converter in response to the reactive and active power components, wherein said means for producing reference signals for controlling the output voltage includes:
    inner current control loops;
    an active power vs. active voltage droop $$u=u^*-mP$$

for generating an active voltage reference signal from the active power component, with $u^*$ being the active voltage with P=0 and m being a constant; and
    a reactive power vs. frequency droop $$f=f^*-nQ$$

to regulate a frequency of the output voltage from the reactive power component, with $f^*$ being the frequency with Q=0 and n being a constant.

2. Power conversion system comprising:
    two or more AC output converter units of a variable AC output voltage, each converter unit including:
    means for controlling an output voltage of said converter unit, said means for controlling an output voltage having means to produce two perpendicularly-intersecting reactive and active voltage vectors ($u_q$, $u_d$) in response to the output voltage of said converter unit to produce a reactive power component (Q) and active power component (P), respectively, and
    means for producing reference signals for controlling the output voltage of said converter in response to the reactive and active power components, wherein a phase locked loop is used for generating a frequency and a phase for transforming measured voltages and currents into said reactive and active voltage vectors ($u_q$, $u_d$), and wherein said means for producing reference signals for controlling the output voltage includes:
    inner current control loops; and
    an active power vs. frequency droop $$f=f^*-nP$$

for regulating the frequency of the output voltage, with $f^*$ being a frequency with P=0 and n being a constant.

3. Method for controlling two or more AC output converter units of a variable AC output voltage, comprising:
    producing perpendicularly-intersecting reactive and active voltage vectors ($u_q$, $u_d$) to control the output voltage and to produce a reactive power component (Q) and active power component (P), respectively;
    producing reference signals to regulate reactive and active components of the output voltage;
    setting the reference signal of the reactive component of the output voltage to zero;
    regulating the reactive component of the output voltage to zero;
    setting the active voltage reference according to an active power vs. active voltage droop $u=u^*-mP$, with $u^*$ being the active voltage with P=0 and m being a constant, to regulate the active voltage component of the output voltage based on the active power component; and
    setting the frequency of the output voltage according to a reactive power vs. frequency droop $f=f^*-nQ$, with $f^*$ being the frequency with Q=0 and n being a constant, to regulate the frequency based on the reactive power component.

4. Method for controlling two or more AC output converter units of a variable AC output voltage, comprising:
    producing perpendicularly-intersecting reactive and active voltage vectors ($u_q$, $u_d$) to control the output voltage and to produce a reactive power component (Q) and active power component (P), respectively, with a phase locked loop generating a frequency and a phase for transforming measured voltages and currents into said reactive and active voltage vectors;

producing reference signals using at least one inner current control loop to regulate reactive and active components of the output voltage;

setting the reference signal of the reactive component of the output voltage to zero;

regulating the reactive component of the output voltage to zero; and setting the frequency of the output voltage according to an active power vs. frequency droop f=f*−nP, with f* being the frequency with P=0 and n being a constant, to regulate a frequency of the output voltage based on the active power component.

5. An AC output converter unit comprising:

means for controlling an output voltage of said converter unit, said means for controlling an output voltage having means to produce two perpendicularly-intersecting reactive and active voltage vectors ($u_q$, $u_d$) from the output voltage of said converter unit to produce a reactive power component (Q) and an active power component (P), respectively; and means for producing reference signals for controlling the output voltage of said converter in response to the reactive and active power components, wherein said means for producing reference signals for controlling the output voltage includes an inner current control loop and implements a droop method to regulate a frequency of the output voltage.

6. The AC output converter unit of claim 5, comprising:

a reactive power vs. frequency droop $$f=f^*-nQ$$

to regulate a frequency of the output voltage.

7. The AC converter unit of claim 5, comprising:

a phase locked loop for generating a frequency and a phase for transforming measured voltages and currents into said reactive and active voltage vectors ($u_q$, $u_d$).

8. The AC converter unit of claim 5, wherein said means for producing reference signals for controlling the output voltage includes:

an active power vs. frequency droop $$f=f^*-nP$$

for regulating the frequency of the output voltage, with f* being a frequency with P=0 and n being a constant.

* * * * *